United States Patent [19]
Emmermann

[11] Patent Number: 6,157,313
[45] Date of Patent: Dec. 5, 2000

[54] METHOD AND APPARATUS UTILIZING A MULTIFUNCTION REMOTE APPLIANCE SENSOR

[75] Inventor: George Alexander Emmermann, Boca Raton, Fla.

[73] Assignee: Motorola, Schaumburg, Ill.

[21] Appl. No.: 09/025,807

[22] Filed: Feb. 19, 1998

[51] Int. Cl.⁷ .............................. G08B 5/22; G08C 19/00
[52] U.S. Cl. .............................. 340/825.31; 340/825.44; 340/825.69; 340/825.72
[58] Field of Search ........................ 340/825.31, 825.32, 340/825.33, 825.44, 311.1, 679, 683, 539; 379/109, 106, 103, 104

[56] References Cited

U.S. PATENT DOCUMENTS

| | | | |
|---|---|---|---|
| 4,797,656 | 1/1989 | Keppler | 340/539 |
| 4,916,439 | 4/1990 | Estes et al. | 340/679 |
| 4,961,073 | 10/1990 | Drapac et al. | 340/825.44 |
| 5,049,874 | 9/1991 | Ishida et al. | 340/825.44 |
| 5,376,931 | 12/1994 | Marrs | 340/825.44 |
| 5,586,174 | 12/1996 | Bogner et al. | 379/106 |
| 5,587,706 | 12/1996 | Branner et al. | 340/825.44 |
| 5,612,682 | 3/1997 | DeLuca et al. | 340/825.34 |
| 5,646,605 | 7/1997 | Leonaggeo et al. | 340/825.31 |
| 5,870,030 | 2/1999 | DeLuca et al. | 340/825.44 |
| 5,889,472 | 3/1999 | Nagel et al. | 340/825.31 |
| 5,990,785 | 11/1999 | Suda | 340/426 |

*Primary Examiner*—Michael Horabik
*Assistant Examiner*—M. Phan
*Attorney, Agent, or Firm*—Pablo Meles

[57] ABSTRACT

A system (10) utilizing a multifunction remote appliance sensor that remotely senses a status of an appliance (20) and that locks and unlocks the appliance. The system includes a selective call receiver (50) for receiving status information from the appliance, and a processor (56 or 21) for electronically applying a credit or debit value to a memory (72 or 21) coupled to the system, wherein a debit value is applied to the memory when the appliance is used. The system further includes a key mechanism (69) coupled to the selective call receiver for locking and unlocking the appliance.

20 Claims, 4 Drawing Sheets

_10_

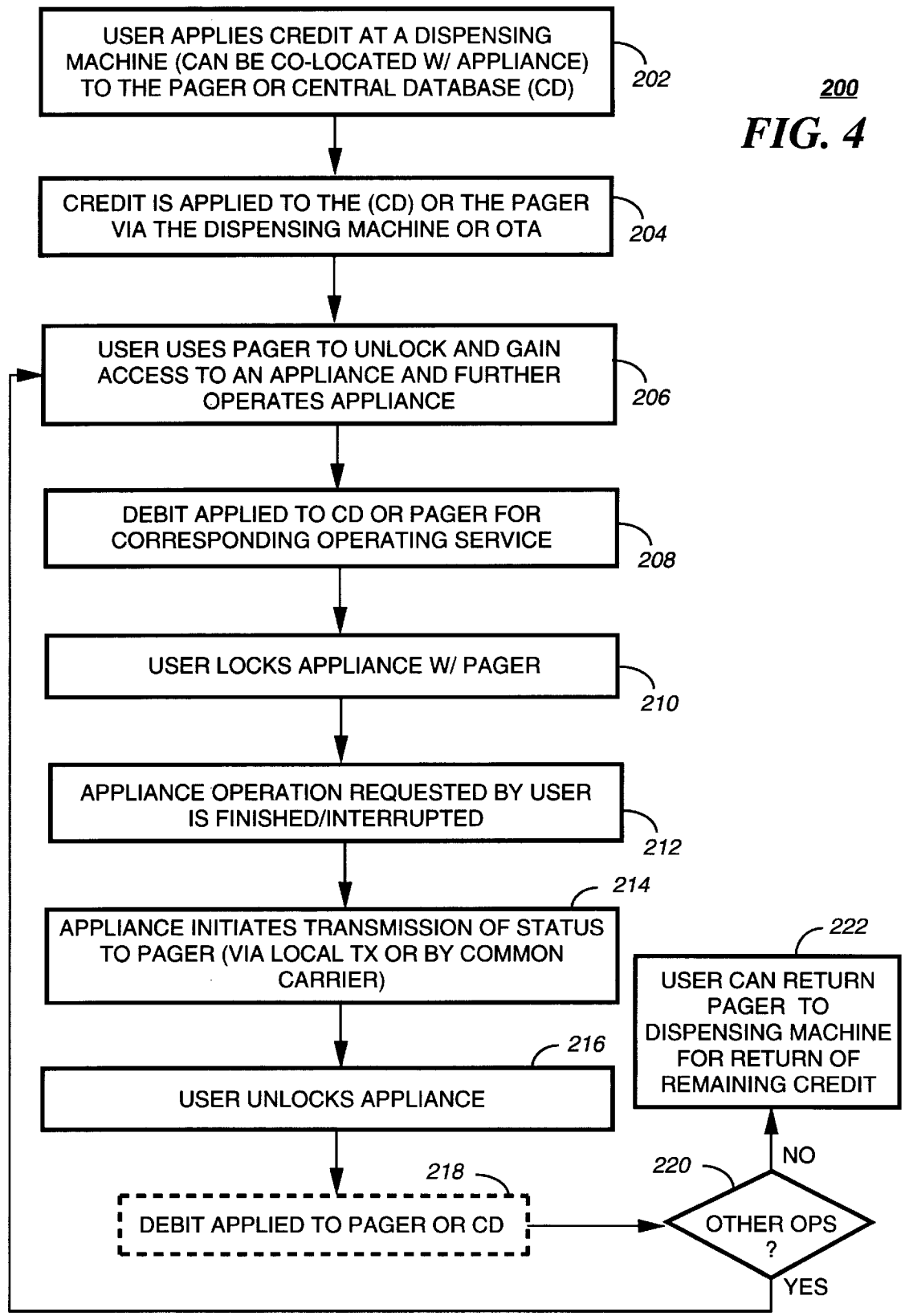

METHOD AND APPARATUS UTILIZING A MULTIFUNCTION REMOTE APPLIANCE SENSOR

FIELD OF THE INVENTION

This invention relates generally to a selective call receiver system, and more particularly to a method and apparatus for using a selective call receiver that further functions as a key and a debiting device.

BACKGROUND OF THE INVENTION

Users of coin operated laundering appliances typically put their clothing into an appliance along with a payment and then wait for completion of a wash or dry cycle. The appliance typically does not have a lock mechanism or a means of disabling operations when an unauthorized user attempts to remove clothing. Users of coin operated laundry machines are subjected to wasted waiting time and potential theft. Further, typical coin operated laundry machines require exact change for their operation creating further inconvenience, particularly if a nearby change machine is out of order or non-existent.

U.S. Pat. No. 4,797,656 by Keppler discusses a laundry dryer that has a humidity sensor that can determine the end of a drying cycle and provide a corresponding signal over the air to a hand-held receiver. Such a system neglects the practicalities of laundry facilities where thefts can easily occur or where exact change is not found. Thus, a need exists for a convenient method and apparatus that not only provides a wireless tether for warning of a completed task, but further conveniently completes a financial transaction while preventing theft of time and clothing.

SUMMARY

In a first aspect of the present invention, a selective call receiver and key device for remotely sensing a status of an appliance and for locking and unlocking the appliance comprises a selective call receiver for receiving status information from the appliance, a processor for electronically applying a credit or debit value to a memory coupled to the selective call receiver, wherein a debit value is applied to the memory when the appliance is used, and a key mechanism coupled to the selective call receiver for locking and unlocking the appliance.

In a second aspect of the present invention, a system utilizing a multifunction remote appliance sensor that remotely senses a status of an appliance and that locks and unlocks the appliance comprises a selective call receiver for receiving status information from the appliance, a processor for electronically applying a credit or debit value to a memory coupled to the system, wherein a debit value is applied to the memory when the appliance is used, and a key mechanism coupled to the selective call receiver for locking and unlocking the appliance.

In a third aspect of the present invention, a method of remote sensing, locking and unlocking an appliance utilizing a selective call receiver system comprises the steps of permitting the unlocking and locking of the appliance with a key mechanism coupled to a selective call receiver and debiting a value stored in a memory associated with the selective call receiver when the appliance performs at least one of a predetermined number of operations. Then, the method further comprises the step of transmitting a message to the selective call receiver when the status of the appliance changes to a predetermined state.

BRIEF DESCRIPTION OF THE DRAWINGS

FIG. 4 is a flow diagram illustrating a method in accordance with the present invention.

DETAILED DESCRIPTION OF THE INVENTION

Figure 1:
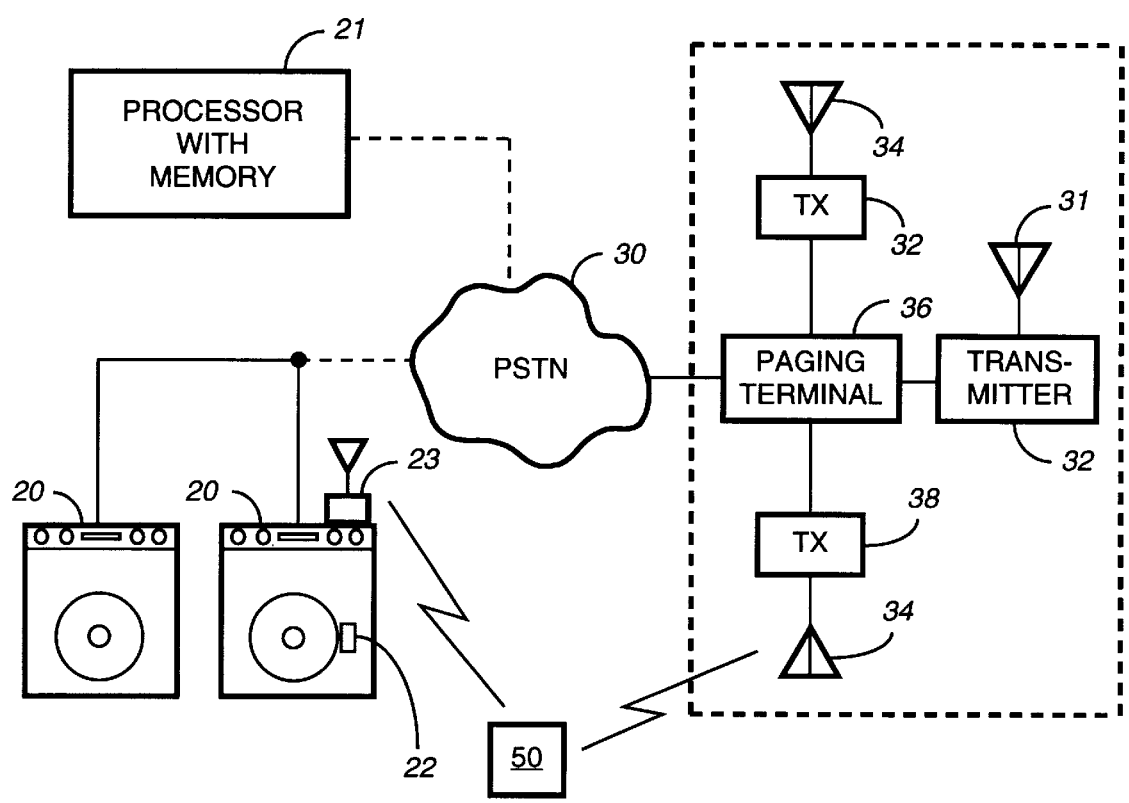
FIG. 1 is a block diagram of a system utilizing a multifunction remote appliance sensor that remotely senses a status of an appliance and further locks and unlocks the appliance in accordance with the present invention.

Referring to FIG. 1, a block diagram is shown of a system 10 utilizing a multifunction remote appliance sensor that remotely senses a status of an appliance 20 and that locks and unlocks the appliance. The system preferably comprises a wireless device such as a selective call receiver 50 for receiving status information from the appliance. The system also preferably includes a processor 21 for electronically applying a credit or debit value to a memory coupled to the system, wherein a debit value is applied to the memory when the appliance is used. The processor and memory can be physically connected to the appliance as shown in FIG. 1, but alternatively, the processor and memory can form a portion of the selective call receiver as will be discussed and shown with reference to FIG. 2. Additionally, the system may comprise a key mechanism 69 (see FIG. 2) coupled to the selective call receiver 50 for locking and unlocking the appliance 20, for instance via a locking mechanism interface 22.

Operationally, the system 10 in accordance with the present invention can be embodied in many different configurations. In one form of the invention, the appliance 20 could include its own transmitter 23 for transmitting a status to the selective call receiver 50. In another embodiment, the appliance could be coupled to a paging terminal 36 of a common carrier or service provider (most likely through a Public Switching Telephone Network (PSTN) 30) and messages could be sent to the selective call receiver 50 via the paging terminal and one or more of a series of transmitters 32 each having an antenna 34. Thus, if the appliance was a washer or a dryer, the transmitter 23 or 32 could notify the user of the selective call receiver 50 that the wash or dry cycle was completed. Of course, the appliance contemplated for use with the present invention could be one of a myriad of devices including, but not limited to washers, dryers, printers, copiers, and vending machines. Additionally, it is further contemplated within the scope of the claims that the status from multiple appliances can be transmitted to the selective call receiver.

Figure 2:
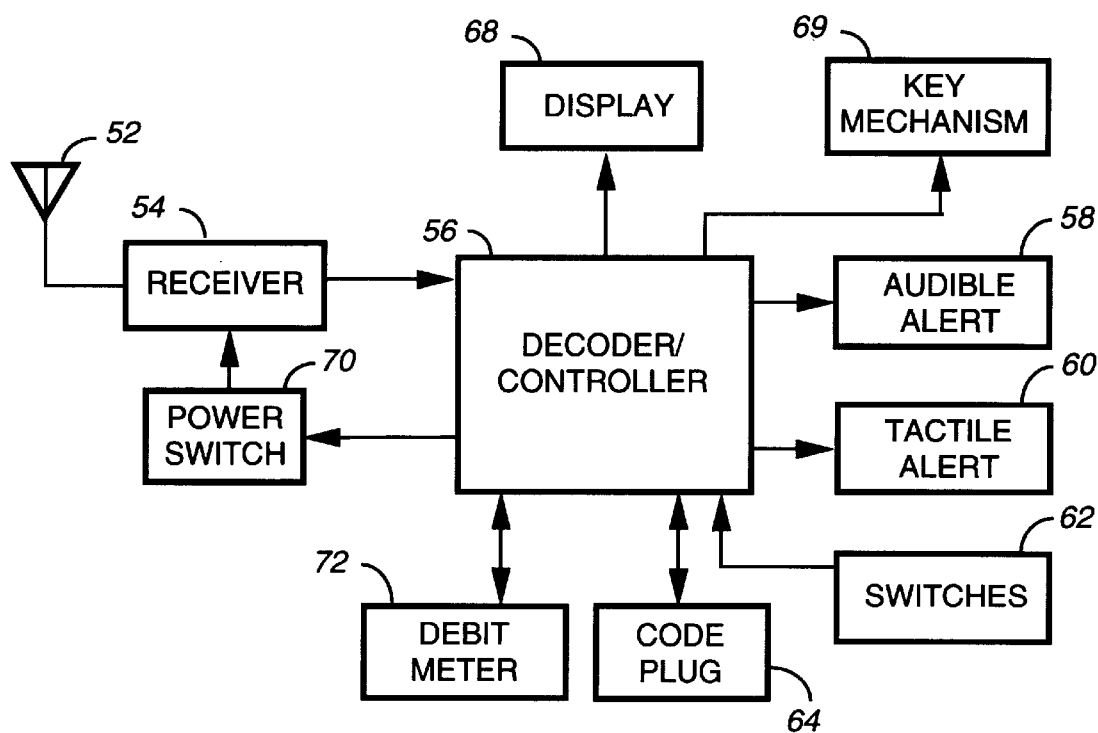
FIG. 2 is a block diagram of a selective call receiver in accordance with the present invention.

Referring to FIGS. 1 and 2, the key mechanism in the selective call receiver 50 could also take many forms. For instance, the key mechanism could be a coded identification that is transferred to the appliance 20 via the locking mechanism interface 22 allowing a user of the appliance unimpeded access to the appliance. The transfer of data can be done in many ways including an infrared port on the selective call receiver, or via a low power radio frequency transmission, or a magnetic strip, or a contactless magnetic data transfer mechanism (such as currently used with Motorola's Indala proximity access cards.)

The selective call receiver 50 shown in FIGS. 1 and 2 preferably comprises an antenna 52 for intercepting transmitted radio frequency (R.F.) signals which are coupled to the input of a receiver 54. The R.F. signals are preferably selective call (paging) message signals which provide a receiver address and an associated message, such as numeric or alphanumeric message that preferably provides status information concerning the appliance 20. It should be appreciated that other well known paging signaling formats, such as tone only signaling or tone and voice signaling, would be suitable for use as well. The receiver 54 processes the R.F. signal and preferably produces at the output a data stream representative of a demodulated address and message information. The demodulated address and message information are coupled into the input of a decoder/controller 56 which processes the information in a manner well known in the art. A power switch 70, coupled to the decoder/controller 56, is used to control the supply of power to the receiver 54, thereby providing a battery saving function as is well known in the art for use with selective call receivers.

For purposes of this illustration, it will be assumed that the FLEX™ signaling format is utilized which is well known in the art, although other signaling formats could be utilized as well. When the address is received by the decoder/controller 56, the received address is compared with one or more addresses stored in a code plug (or code memory) 64, and when a match is detected an alert signal is generated to alert a user that a selective call message, or page, has been received. The alert signal can be directed to an audible alerting device 58 for generating an audible alert or to a tactile alerting device 60 for generating a silent vibrating alert. Switches 62 can allow the user of the selective call receiver to select between the audible alert 58 and the tactile alert 60 in a manner well known in the art. In one form of the present invention, a key mechanism 69 is coupled to the decoder 56 which allows the selective call receiver to transfer data or an identification code to a key mechanism interface 22 on the appliance. With the transfer of the identification code, the user of the selective call receiver 50 can obtain access to the appliance for its intended purpose. In the case where the appliance is a washer or dryer, the code can give the user access to lock and unlock the doors or to operate the machines. If the selective call receiver has a display, in yet another embodiment, the identification code could be displayed at the selective call receiver and the user can manually input the code into the appliance, particularly if the appliance includes a keypad.

The message information which is subsequently received at the selective call receiver 50 is stored in memory (not shown) and can optionally be accessed by the user for display using one or more of the switches 62 which provide such additional functions as reset, read, and delete, etc. Specifically, by the use of appropriate functions provided by the switches 62, the stored message is recovered from memory and processed by the decoder/controller 56 for displaying by a display 68 which enables the user to view the message. Of course, the present invention does not necessarily require the use of a display, but it provides a very convenient option particularly if the selective call receiver is used personally by the user outside the appliance scenario as a common pager.

Figure 3:
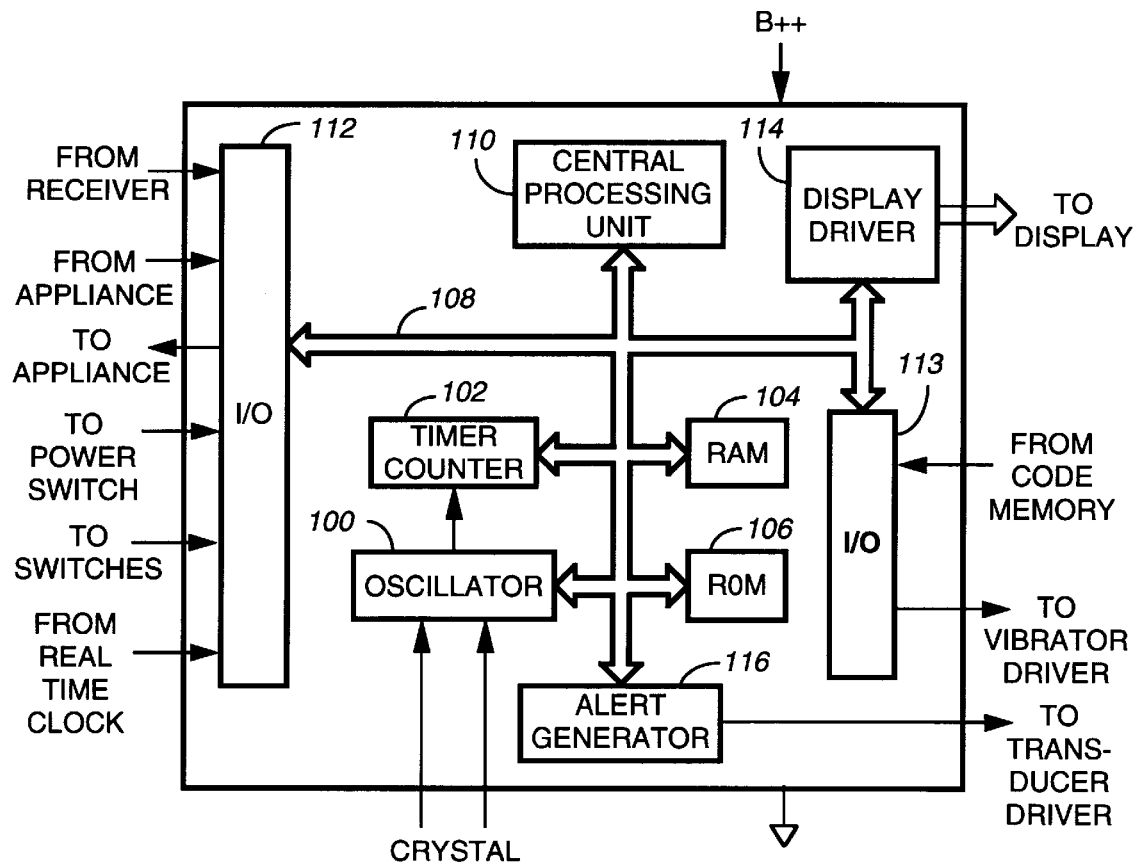
FIG. 3 is a block diagram of a decoder/controller in accordance with the present invention.

The controller/decoder 56 of FIG. 2 can be constructed utilizing a microcomputer as shown in FIG. 3. FIG. 3 is an electrical block diagram of a microcomputer based decoder/controller suitable for use in the selective call receiver of FIG. 2. As shown, the microcomputer 56 is preferably an MC68HC05 microcomputer manufactured by Motorola, Inc. which includes an on-board display driver 114. The Microcomputer 56 includes an oscillator 100 which generates the timing signals utilized in the operation of the microcomputer 56. A crystal, or crystal oscillator (not shown) is coupled to the inputs of the oscillator 100 to provide a reference signal for establishing the microcomputer timing. A timer/counter 102 couples to the oscillator 100 and provides programmable timing functions which are utilized in controlling the operation of the receiver. A RAM (random access memory) 104 is utilized to store variables derived during processing, as well as to provide storage of message information which are received during operation as a selective call receiver. A ROM (read only memory) 106 stores the subroutines which control the operation of the receiver, as is well known to those skilled in the art. It will be appreciated that in many microcomputer implementations, the programmable-ROM (PROM) memory area can be provided by an EEPROM (electrically erasable programmable read only memory). The oscillator 100, timer/counter 102, RAM 104, and ROM 106 couple through an address/data/control bus 108 to a central processing unit (CPU) 110 which performs the instructions and controls the operations of the microcomputer 56.

The demodulated data generated by the receiver is coupled into the microcomputer 56 through an input/output (I/O) port 112. The demodulated data is process by the CPU 110, and when the received address is the same as the code-plug memory which couples into the microcomputer through an I/O port 113, the message, if any, is received and stored in RAM 104. Recovery of the stored message, and selection of the predetermined destination address, is provided by the switches which are coupled to the I/O port 112. The microcomputer then recovers the stored message, and directs the information over the data bus 108 to the display driver 114 which processes the information and formats the information for presentation by a display such as an LCD (liquid crystal display). At the time a selective call receiver address is received, the alert signal is generated which can be routed through the data bus 108 to an alert generator 116 that generates the alert signal which is coupled to the audible alert device that was described above. Alternatively, when the vibrator alert is selected as described above, the microcomputer generates an alert enable signal which is coupled through data bus 108 to the I/O port 113 to enable generation of a vibratory, or silent alert.

The key mechanism 69 (of FIG. 2) can be as simple as a locking and unlocking software routine that can be stored in ROM 106 or alternatively loaded into RAM 104. Preferably, the I/O port 113 and data bus 108 are used to allow the key mechanism interface 22 (of FIG. 1) to probe the microcomputer 56 for an access code or identification code from the key mechanism 69 that would allow the appliance to lock and unlock and otherwise function normally. The key mechanism 69 could also be embodied as a physical/mechanical key within the scope of the present invention.

The battery saver operation is controlled by the CPU 110 with battery saving signals which are directed over the data bus 108 to the I/O port 112 which couples to the power switch. Power is periodically supplied to the receiver to enable decoding of the received selective call receiver address signals and any message information which is directed to the receiver.

FIG. 2 shows a debit meter 72 which is coupled to the decoder/controller 56 for establishing a debiting system. The debit meter 72, when fully replenished (e.g., when the debit meter 72 is indicating the total number of available credit units), indicates the available number of credit units for enabling the user of the selective call receiver 50 to access the appliance 20 and its functions or services. If the financial transactions are to be processed within the selective call receiver 50, then the decoder/controller 56 calculates the number of credit units (or debit units) from a stored parameter in memory. Those skilled in the art will appreciate that the parameter may comprise other variables, such as, a time associated with use of the appliance. A charge, in debit units, is preferably assigned to each particular function of the appliance, and the decoder/controller 56 counts (accumulates) the number of operations (of the appliance(s)) to determine the total number of debit units. This charge, debit units, is preferably calculated at the time the appliance is first operated. The decoder/controller 56 then debits (subtracts) the total number of message debit units from the number of indicated or available credit units of the debit meter 72. Upon debiting the number of debit units from the indicated number of credit units of the debit meter 72, the decoder/controller 56 enables access to the appliance when there is at least a zero balance or a sufficient number of available credits units in the debit meter 72 (e.g., when the debit meter 72 is not depleted), and preferably disables access to the appliance once the debit meter 72 is depleted after its last usage. Thus, once the calculated debit units are debited from the available credit units of the debit meter 72, the appliance is accessible to the user at no extra charge irrespective of the number of times the user accesses the appliance. The locking and unlocking function of the selective call receiver should always function on the appliance as long as the debit meter is in "good standing." Of course, other precautions besides the selective call receiver identification code can be incorporated including the use of a session identifier for each operation. This would prevent users from getting debited when the appliance is accessed more than once. In other words, the function or operation is debited only once. The debit meter 72 then can indicate the remaining number of credits units available for subsequent operations at the appliance or other appliances.

As previously mentioned, the system 10 in another embodiment can have a transactional processor 21 having a database capable of tracking debit and credit values associated with the selective call receiver rather than having debit meter 72 within the selective call receiver. This would allow for a lower cost portable unit and permit the owner of the system to track usage of individual appliances centrally.

In another aspect of the present invention, a method 200 of remote sensing, locking and unlocking an appliance utilizing a selective call receiver system is shown with respect to FIG. 4. The selective call receiver in this instance is operating as a portable financial transaction device. Initially, at step 202, the user would want to apply credit to the selective call receiver, possibly at a dispensing machine co-located with or nearby the appliance. As shown at step 204, the credit can be applied in various ways including applying credit to the selective call receiver directly via the dispensing machine or over the air to the selective call receiver via transmitters 23 or 32. Alternatively, the credit can be applied to the central database at a transaction processor 21 coupled to the system 10 as shown in FIG. 1. In this embodiment, the transaction processor 21 is analagous to an authomated teller machine (ATM). At step 206 the user is permitted to unlock and lock and otherwise operate the appliance with a key mechanism coupled to a selective call receiver. Then, at step 208, a debit value is applied in a memory associated with the selective call receiver when the appliance performs at least one of a predetermined number of operations. The memory that is debited can either reside in the selective call receiver itself or the transaction processor 21 or both if desired. The user can then lock the appliance (to prevent tampering by others) with the selective call receiver at step 210. When the status of the appliance changes to a predetermined state (as shown at step 212 where an appliance operation is finished or interrupted for instance), the system 10 can transmit a message reflective of the status to the selective call as done at step 214. Again, the message can be equally transmitted by a local on-site transmitter or by a wider area transmitter from a common carrier. Once the user receives the status message, the user can then unlock the appliance "at step 216" from its current state. Optionally, rather than debiting a value from memory at step 208 before services are rendered, a system operator can allow the debiting function to occur after the appliance services or operations are done as shown at step 218. If the user of the selective call receiver requires no further appliance operations the user can return the selective call receiver to the dispenser for a return of any remaining credit as shown at step 222. Alternatively, if the selective call receiver is a personal pager, the user could leave with their device and use it for subsequent appliance services in the future. If the user desires further operations at decision block 220, then the method 200 can return to step 206 allowing the user access to the same appliance once again or a different appliance if desired.

What is claimed is:

1. A selective call receiver and key device for remotely sensing a status of an electronic appliance and for locking and unlocking the electronic appliance, comprising:

a selective call receiver for receiving status information from the electronic appliance;

a processor for electronically applying a credit or debit value to a memory coupled to the selective call receiver, wherein a debit value is applied to the memory when the electronic appliance is used; and a key mechanism coupled to the selective call receiver for locking and unlocking the electronic appliance.

2. The selective call receiver and key device of claim 1, wherein the key mechanism is a coded identification that is transferred to the appliance allowing a user of the electronic appliance unimpeded access to the appliance.

3. The selective call receiver and key device of claim 2, wherein the key mechanism is a coded identification that is transferred via an infrared port on the selective call receiver.

4. The selective call receiver and key device of claim 1, wherein the key mechanism is a coded identification that is transferred via a radio frequency communications link.

5. The selective call receiver and key device of claim 1, wherein the electronic appliance is selected from the group consisting of washers, dryers, copiers, printers, or vending machines.

6. The selective call receiver and key device of claim 1, wherein the selective call receiver further comprises a display coupled to the selective call receiver for displaying the status information.

7. A system utilizing a multifunction remote appliance sensor that remotely senses a status of an electronic appliance and that locks and unlocks the appliance, comprising:

a selective call receiver for receiving status information from the electronic appliance;

a processor for electronically applying a credit or debit value to a memory coupled to the system, wherein a debit value is applied to the memory when the electronic appliance is used; and a key mechanism coupled to the selective call receiver for locking and unlocking the electronic appliance.

8. The system of claim 7, wherein the key mechanism is a coded identification that is transferred to the electronic appliance allowing a user of the appliance unimpeded access to the electronic appliance.

9. The system of claim 8, wherein the key mechanism is a coded identification that is transferred via an infrared port on the selective call receiver.

10. The system of claim 7, wherein the key mechanism is a coded identification that is transferred via a radio frequency communications link.

11. The system of claim 7, wherein the electronic appliance is selected from the group consisting of washers, dryers, copiers, printers, or vending machines.

12. The system of claim 7, wherein the selective call receiver further comprises a display coupled to the selective call receiver for displaying the status information.

13. The system of claim 7, wherein the processor and memory are coupled to the selective call receiver.

14. The system of claim 7, wherein the processor and memory are coupled to the electronic appliance.

15. The system of claim 14, wherein the memory contains a database capable of tracking debit and credit values associated with the selective call receiver.

16. The system of claim 14, wherein the system further comprises a transmitter coupled to the appliance for transmitting a message to the selective call receiver giving notice of a change in status at the electronic appliance.

17. The system of claim 14, wherein the system further comprises a connection to a remote paging terminal from the electronic appliance for transmitting a message to the selective call receiver giving notice of a change in status at the electronic appliance.

18. A method of remote sensing, locking and unlocking an electronic appliance utilizing a selective call receiver system, comprising the steps of:

permitting the unlocking and locking of the electronic appliance with a key mechanism coupled to a selective call receiver;

debiting a value stored in a memory associated with the selective call receiver when the appliance performs at least one of a predetermined number of operations; and transmitting a message to the selective call receiver when a status of the electronic appliance changes to a predetermined state.

19. The method of claim 18, wherein the step of debiting a value further comprises the step of debiting a value stored in the selective call receiver.

20. The method of claim 18, wherein the predetermined state is selected from the group consisting of end of dry cycle, end of wash cycle, interrupted cycle, end of copying, or end of printing.

* * * * *